United States Patent [19]

Capaldi et al.

[11] Patent Number: 4,555,946
[45] Date of Patent: Dec. 3, 1985

[54] ACCELEROMETER

[75] Inventors: Nicholas R. Capaldi; Brian W. Griffin, both of Cheltenham, England

[73] Assignee: Smiths Industries Public Limited Company, London, England

[21] Appl. No.: 580,302

[22] Filed: Feb. 15, 1984

[30] Foreign Application Priority Data

Feb. 25, 1983 [GB] United Kingdom ................ 8305252

[51] Int. Cl.$^4$ ............................................. G01P 15/13
[52] U.S. Cl. .................................................. 73/517 B
[58] Field of Search ...................................... 73/517 B

[56] References Cited

U.S. PATENT DOCUMENTS 4,088,027  5/1978  Hernandez et al. .............. 73/517 B
4,335,611  6/1982  Bennett et al. ................... 73/517 B
4,495,815  1/1985  Stratton et al. ................... 73/517 B

FOREIGN PATENT DOCUMENTS 1362121  7/1974  United Kingdom ............. 73/517 B

Primary Examiner—Stewart J. Levy
Assistant Examiner—John E. Chapman, Jr.
Attorney, Agent, or Firm—Pollock, Vande Sande and Priddy

[57] ABSTRACT

An accelerometer has a tubular coil that surrounds coaxially a cylindrical magnet. The magnet is polarized along a second axis transversely of the common axis of the coil and magnet. A sleeve of soft-iron surrounds the magnet and coil to provide a magnetic return path, the sleeve having two vertical slots which receive bearings. The bearings are carried by a shaft that extends across and above one end of the coil so that the coil is supported for angular displacement about a third axis orthogonal with the common axis and the second axis and displaced from the second axis. An optical pick-off mounted below the other end of the coil is used to sense rotation about the third axis, by detecting displacement of a portion of the former on which the coil is wound.

10 Claims, 2 Drawing Figures

ACCELEROMETER

BACKGROUND OF THE INVENTION

This invention relates to accelerometers.

Accelerometers generally have a seismic mass that is mounted for displacement under the forces caused by acceleration. Displacement of the mass is sensed by a pick-off, and a restoring force is applied to the mass to restore it to its datum position, in a servo manner. By measuring the restoring force, an indication of acceleration can be provided.

In one form of conventional accelerometer, the seismic mass is provided by a cylindrical coil that is mounted for displacement along the length of an axiallypolarized cylindrical permanent magnet. The mounting is achieved by an arm tht projects radially from the coil and that is pivoted about an axis at right angles to the axes of the coil and of the arm. A conventional pickoff senses displacement of the arm and supplied signals via a feedback circuit to the coil such that the magnetic field produced by the coil interacts with that of the magnet in a sense to restore the coil to its datum position. Measuring the current supplied to the coil provides an indication of the component of acceleration acting on the accelerometer along the coil axis.

While such accelerometers can function satisfactorily, the configuration of the coil and its mounting makes it somewhat bulky. The configuration of the coil and the permanent magnet also leads to considerable stray magnetic fields and a relatively low efficiency.

BRIEF SUMMARY OF THE INVENTION

It is an object of the present invention to provide an acceleromoter that can be used substantially to alleviate the above-mentioned disadvantages.

According to one aspect of the present invention there is provided an accelerometer including a coil of tubular configuration that surrounds coaxially along a first axis a magnet of cylindrical shape, the magnet being polarized along a second axis that extends transversely of the first axis, and the coil being mounted for angular displacement about a third axis orthogonal with the first axis and the second axis, such that a component of acceleration along the second axis produces angular displacement of the coil about the third axis which can be restored to its datum position by energization of the coil.

The third axis may extend across one end of the coil, and the coil may be supported by a shaft that extends coaxially with the third axis. The coil and the magnet may be circular in section. A sleeve of magnetic material may surround the magnet defining an annular gap therebetween within which the coil extends. The sleeve may project beyond an end of the coil, the sleeve being provided with two opposite slots aligned along the third axis, and the coil being mounted by bearings located in respective ones of the slots. The third axis may extend across one end of the coil, the accelerometer including pick-off means arranged to sense displacement of the coil, the pick-off means being mounted at the other end of the accelerometer remote from the third axis. The coil may be wound on a former, a portion of the former projecting beyond the coil and being arranged to provide a part of pick-off means for sensing displacement of the coil. The pick-off means may be an optical pick-off. The coil may be provided as a single unit together with bearings by which the coil is mounted and a part of pickoff means arranged to sense displacement of the coil.

An accelerometer in accordance with the present invention, will now be described, by way of example, with reference to the accompanying drawings.

DETAILED DESCRIPTION

Figure 1:
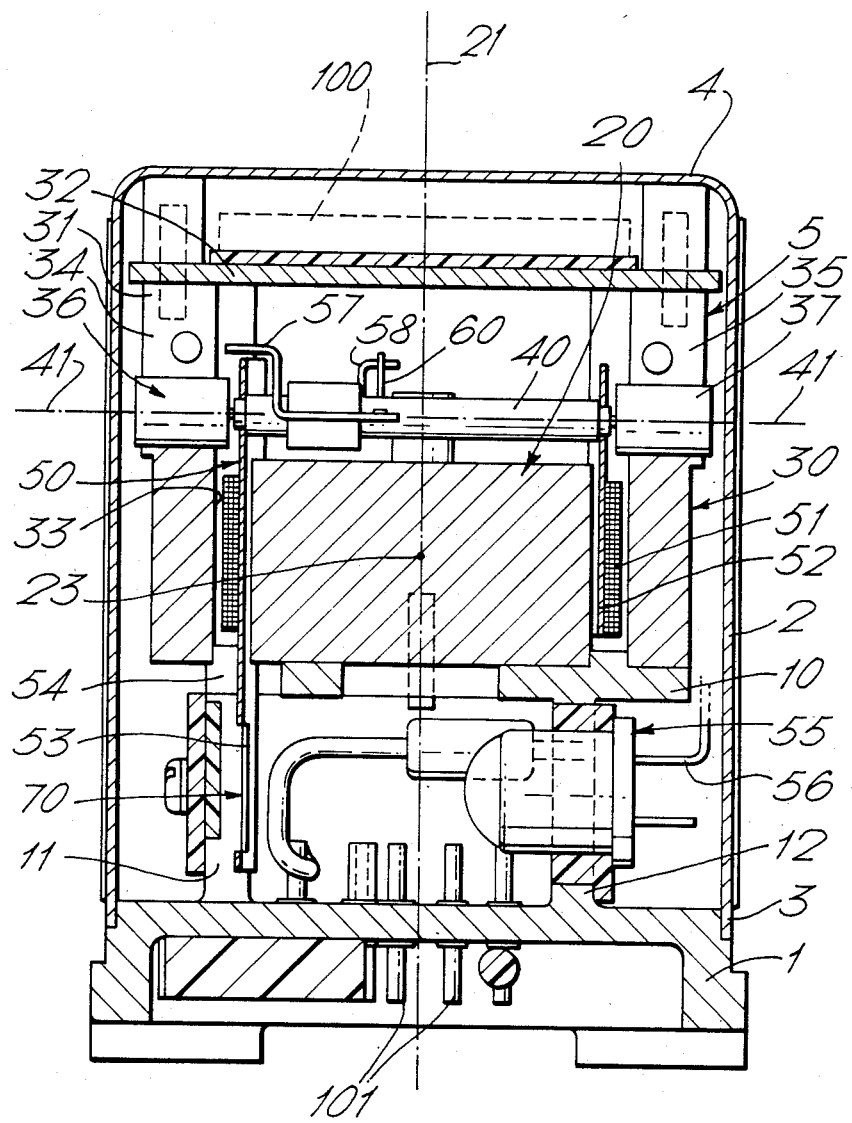
FIG. 1 is a sectional side elevation of the accelerometer.

The accelerometer has a circular metal base plate 1 to which a cylindrical metal cap 2 is welded about its lower edge 3. The cap 2 is closed at its upper end 4 and encloses the accelerometer mechanism 5 which is supported on the base plate 1. Preferably the accelerometer is filled with an inert gas to protect the mechanism 5.

A flat, horizontal table 10 is supported a short distance above the base plate 1 on two pillars 11 and 12, the base plate, pillars and the table being formed as an integral unit. On the table 10 there is secured a cylindrical samarium cobalt permanent magnet 20 which is located centrally of the vertical axis 21 of the accelerometer. The magnet 20 is polarized along a diameter perpendicular to the plane of the paper in FIG. 1, and colinear with an axis 23 (FIG. 2).

The table 10 also supports a rigid vertical sleeve 30 of soft iron, the upper end 31 of which is closed by a horizontal top plate 32. The internal diameter of the sleeve 30 is such that an annular gap 33 is formed between the sleeve and the outer curved surface of the magnet 20. Two vertical, axially-aligned slots 34 and 35 are formed in the upper end of the sleeve 30 diametrically opposite one another. The slots 34 and 35 receive respective jewelled bearings 36 and 37 which in turn support opposite ends of a horizontal shaft 40. The axis 41 of the shaft 40 is aligned at right angles to both the accelerometer axis 21 and the axis 23 of polarization of the magnet 20.

The shaft 40 carries a torquer coil assembly 50 suspended beneath it in the annular gap 33 between the magnet 20 and the sleeve 30. The coil assembly 50 comprises annular electrical windings, forming the coil 51 itself, which are wound on a tubular former 52 of circular section. The length of the coil 51 is somewhat less than that of the magnet 20, but the former 52 has an extended leg portion 53 located at the side of the former 52 towards the left-hand end of the shaft 40. The leg portion 53 projects vertically downwards through an aperture 54 in the table 10 and forms a part of a pick-off assembly 70 located beneath the table. The lower end of the leg portion 53 is situated in the line-of-sight of an optical sensor 55 that is mounted in the right hand pillar 12. Movement of the leg portion 53 away from the vertical causes the sensor 55 to produce an output signal on line 56.

Electrical connection of the coil 50 is made by means of two terminals 57 and 58 mounted on the shaft 40. Fine, flexible, conductive ligaments 59 and 60 electrically connect the terminal members 57 and 58 with respective rigid termals 61 and 62 mounted on the top of the sleeve 30. The ligaments 59 and 60 are sufficiently flexible to allow for unimpeded angular displacement of the shaft 40. The terminals 61 and 62 are connected with an electronic control unit 100 that is secured to the upper surface of the top plate 32. Output signals from the pick-off assembly 70 on line 56 are also supplied to the control unit 100. External electrical connection of the control unit 100 is established by connection to terminals 101 which project from the external side of the base plate 1 and which are connected within the accelerometer to the control unit 100.

Figure 2:
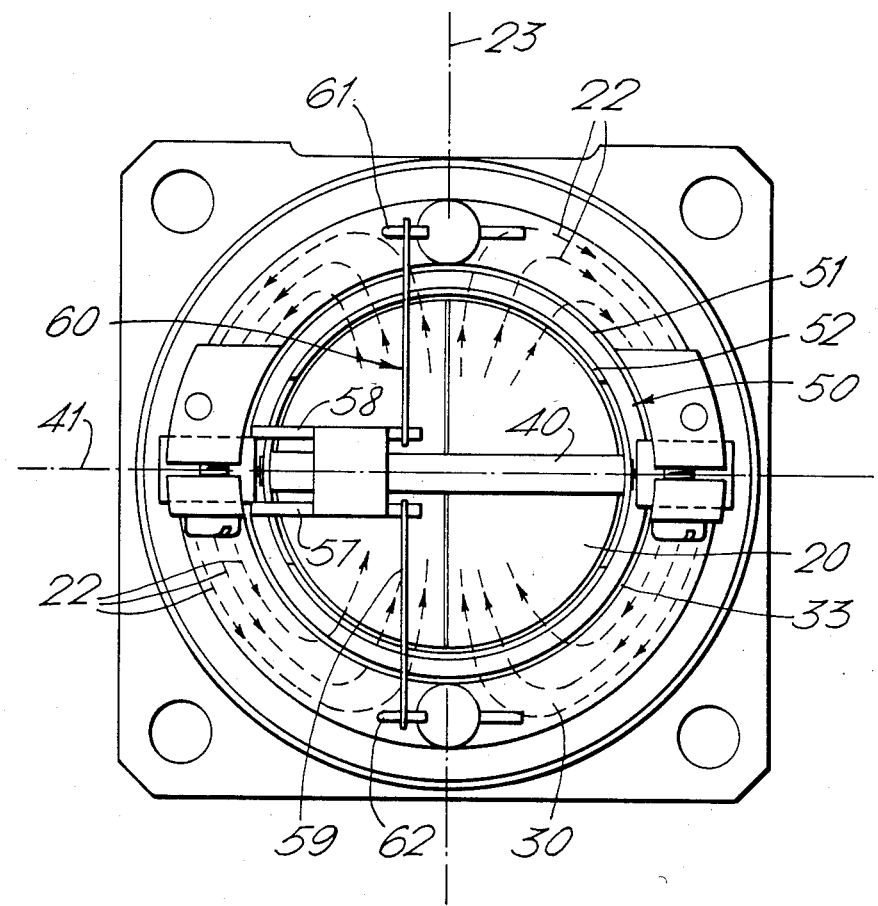
FIG. 2 is a cut-away plan view of the accelerometer.

In operation, the coil 51 and its former 52 provide the seismic mass of the accelerometer so that, if the accelerometer is subject to any acceleration having a component perpendicular to the plane of the paper in FIG. 1, along the axis 23, the force acting on the coil assembly 50 will cause it to be deflected about the axis 41 of the shaft 40. Any such deflection is immediately sensed by the pick-off assembly 70 which causes the control unit 100 to supply current to the coil 51 to produce a second magnetic field in a servo feedback manner such as to restore the coil to its datum position. More particularly, from FIG. 2 especially, it can be seen that the lines of flux 22 from the magnet 20 lie in a horizontal plane and cut the coil 51, using the sleeve 30 as a return path. The lines of flux 22 cut one half of the circumference of the coil 51 in one sense, and the other half of the coil in the opposite sense. Thus, the interaction of the magnetic field from the magnet 20 and the coil 51 causes one half of the coil 51 to be subject to a vertically-directed upward force whereas the other half of the coil is subjected to an identical downwards force. The result of these forces is a couple tending to twist the coil 51 about its diameter and hence about the axis of suspension 41. The current supplied by the control unit 100 to the coil 51 is sufficient to restore the coil to its datum position, signals representative of this current being supplied to the terminals 101 as a measure of the acceleration. It will be appreciated that the width of the annular gap 33 limits the displacement of the coil 51 but since a restoring force acts to maintain the datum position of the coil, very little displacement of the coil occurs.

The construction and configuration of the accelerometer gives it several advantages. The configuration of the magnet 20 and the surrounding sleeve 30 means that very little stray flux is produced and that the field density in the gap 33 is high. This contributes to the high sensitivity and efficiency of the accelerometer. By mounting the coil 51 on a shaft 40 that extends across the coil, the rigidity of the coil is improved making the accelerometer more rugged. The location of the pick-off assembly 70, which is displaced along the axis 21 of the coil, enables the diameter of the accelerometer to be kept to a minimum. Thus an accelerometer can be provided having a small diameter but with a relatively large coil. The configuration of the accelerometer also enables it to be assembled easily, since the coil assembly 50 with its bearings 36 and 37 can be formed as one unit that is simply dropped into the slots 34 and 35.

Various modifications can be made to the accelerometer described above. For example, the pick-off assembly 70 could be located above the shaft 40, although the present configuration allows for a greater distance between the shaft 40 (and hence for a greater linear displacement of the end of the leg portion 53 for any given angular displacement of the shaft) without increasing the height of the accelerometer. Also, the pick-off could be of alternative construction, such as, of capacitive or inductive form. The coil 51 and magnet 20 need not be of circular section but could, for example, be square or rectangular.

What we claim is:

1. An accelerometer comprising: a magnet of cylindrical shape; an elongate tubular coil; means mounting said coil to surround said magnet coaxially along a first axis, said magnet being polarized along a second axis transverse of the first axis, and said means mounting said coil being operative to permit angular displacement of said coil about a third axis which is orthogonal with each of said first and second axes and displaced above said second axis and above one end of said coil, such that a component of acceleration along said second axis produced angular displacement of said coil about said third axis which can be restored to a datum position by energizing said coil.

2. An accelerometer according to claim 1 wherein said mounting means includes a shaft that extends across said one end of said coil coaxially with said third axis, said shaft supporting said coil.

3. An accelerometer according to claim 1, wherein said coil and said magnet are each circular in cross section.

4. An accelerometer according to claim 1, including a sleeve of magnetic material, and means mounting said sleeve to surround said magnet in spaced relation thereto to define an annular gap within which said coil extends.

5. An accelerometer according to claim 4, wherein said sleeve projects beyond an end of the coil, said sleeve including two opposite slots aligned along said third axis, and said accelerometer including two bearings by which said coil is mounted, said bearings being located in respective ones of said slots.

6. An accelerometer according to claim 1, wherein said accelerometer includes pick-off means arranged to sense displacement of said coil, and means mounting said pick-off means in spaced relation to the other end of said coil remote from said third axis.

7. An accelerometer according to claim 1, including a former, said coil being wound on said former, a portion of said former projecting beyond the coil, said portion of the former comprising a part of pick-off means arranged for sensing displacement of the coil.

8. An accelerometer according to claim 6, wherein said pick-off means is an optical pick-off.

9. An accelerometer according to claim 1, wherein said coil is provided as a single unit together with bearings by which the coil is mounted and a part of pick-off means arranged for sensing displacement of said coil.

10. An accelerometer comprising: a magnet of cylindrical shape; an elongate tubular coil surrounding said magnet coaxially along a first axis, said magnet being polarized along a second axis transverse of said first axis; a shaft extending across and above said coil along a third axis orthogonal with each of said first and second axes and displaced from said second axis, said shaft being secured to said coil; bearing means mounting said shaft and said coil for angular displacement about said third axis; a magnetic return sleeve; means mounting said sleeve to surround said magnet in spaced relation thereto to define an annular gap within which said coil projects; and pick-off means arranged to sense displacement of said coil about said third axis such that the coil can be restored to a datum position by energizing said coil in accordance with said displacement.

* * * * *